(12) United States Patent
Enners et al.

(10) Patent No.: US 6,788,528 B2
(45) Date of Patent: Sep. 7, 2004

(54) HP JORNADA VEHICLE DOCKING STATION/HOLDER

(75) Inventors: Ryan S. Enners, Starksboro, VT (US); Lee Macklin, Colorado Springs, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 214 days.

(21) Appl. No.: 10/040,561

(22) Filed: Jan. 5, 2002

(65) Prior Publication Data

US 2003/0128504 A1 Jul. 10, 2003

(51) Int. Cl.⁷ .............................................. H02B 1/20
(52) U.S. Cl. ........................ 361/683; 361/686; 248/918
(58) Field of Search ........................ 439/503; 361/683, 361/686; 248/918; 710/303

(56) References Cited

U.S. PATENT DOCUMENTS

| | | | | |
|---|---|---|---|---|
| 5,542,589 A | * | 8/1996 | McKee | 224/275 |
| 5,555,491 A | * | 9/1996 | Tao | 361/686 |
| 5,751,548 A | | 5/1998 | Hall et al. | 361/686 |
| 5,859,762 A | | 1/1999 | Clark et al. | 361/686 |
| 5,966,285 A | | 10/1999 | Sellers | 361/686 |
| 5,973,917 A | | 10/1999 | White | 361/683 |
| 6,032,089 A | | 2/2000 | Buckley | 701/36 |
| 6,042,414 A | * | 3/2000 | Kunert | 439/374 |
| 6,113,047 A | | 9/2000 | Wung et al. | 248/284.1 |
| 6,123,309 A | * | 9/2000 | Sage | 248/316.1 |
| 6,381,133 B1 | * | 4/2002 | Chen | 361/686 |
| 6,386,413 B1 | * | 5/2002 | Twyford | 224/553 |
| 6,480,378 B2 | * | 11/2002 | Chang | 361/686 |
| 6,483,698 B1 | * | 11/2002 | Loh | 361/686 |
| 6,539,358 B1 | * | 3/2003 | Coon et al. | 704/275 |
| 2003/0083113 A1 | * | 5/2003 | Chua et al. | 455/569 |

* cited by examiner

Primary Examiner—Chandrika Prasad
Assistant Examiner—Hae Moon Hyeon

(57) ABSTRACT

A docking station and holder for use with a portable computer, and in particular, an HP Jornada™ portable computer. The docking station has a contour that is designed to receive the HP Jornada portable computer. The docking station connects to a center console of a vehicle. The docking station has a cradle that holds the portable computer in place while driving. The docking station has a cigarette lighter adapter for power and a cable that connects it to a stereo system of the vehicle to provide for audio (MP3) playback of music like.

7 Claims, 1 Drawing Sheet

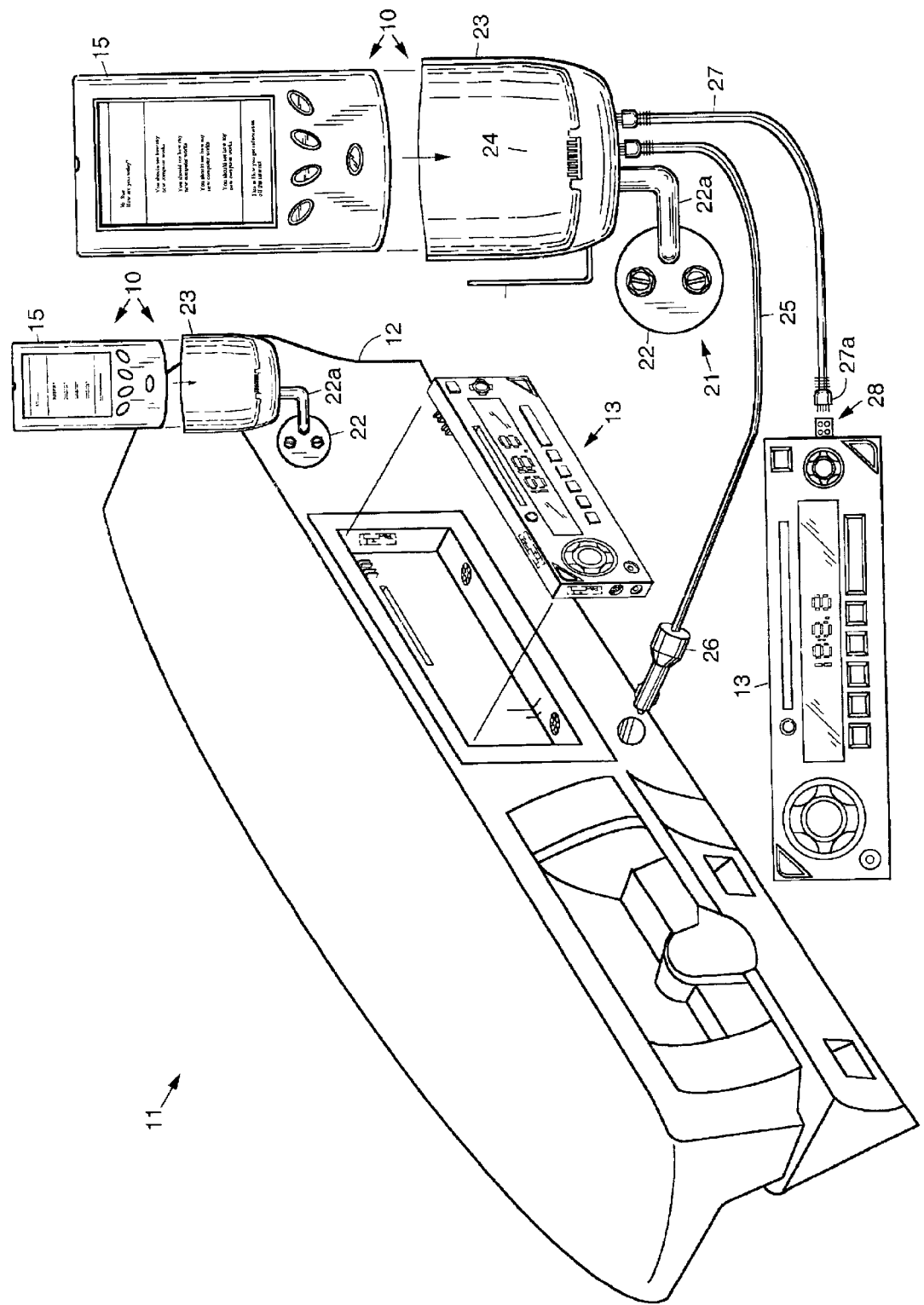

HP JORNADA VEHICLE DOCKING STATION/HOLDER

BACKGROUND

The present invention relates generally to portable computer systems, and more specifically, to an improved vehicle docking station and holder that is particularly well-suited for use with an HP Jornada™ portable computer.

The assignee of the present invention manufactures a handheld portable personal computer (PC) or pocket PC device known as HP Jornada™ portable computer. The HP Jornada is a handheld PC that delivers personal computing power, speed, and flexibility while on the go. The HP Jornada includes memory that allows many applications to run, and allows the user to send and receive e-mail and use the Internet to do business away from home or office.

Currently, there are no docking stations available for the HP Jornada that allow it to be installed to a vehicle. Currently available HP Jornada docking stations are not fixed to the vehicle, which allows the HP Jornada to slide. Furthermore, currently available docking stations do not use a vehicle power source for power for the HP Jornada. The currently available docking stations do not allow playing of MP3 music files through a stereo system of the vehicle.

A search relating to the present invention was performed in the U.S. Patent and Trademark Office and uncovered the following U.S. patents: U.S. Pat. Nos. 5,555,491, 6,113,047, 5,973,917, 5,966,285, 5,859,762, 5,751,548 and 6,03,089.

U.S. Pat. No. 5,555,491 discloses a "compact docking station for portable computer". It is disclosed in this patent that "A compact docking station for a portable computer includes a mounting bracket assembly for supporting together as a compact unit a computer port replicating device, a DC power supply and a light for illuminating the work area of the computer. The mounting bracket assembly includes lower and upper mounting brackets that are pivotably connected to each other. The lower mounting bracket can be directly mounted on a support base such as a vehicle console. The upper mounting bracket provides a computer support surface and carries the port replicating device adjacent thereto. The upper mounting bracket is pivotable between a generally horizontal computer use position, and an upwardly angled computer removal/attachment position. This arrangement allows the computer to be positioned for use in a limited space, with minimal handling and clutter."

It is disclosed in U.S. Pat. No. 5,555,491 that "While the advantages of mobile computer use are manifest, there are specific problems presented by introducing a computer into a vehicular environment: (i) physical mounting and support difficulties, (ii) space limitations, (iii) power conversion problems arising from use of a vehicle battery as a power source, (iv) linking the computer to peripheral devices such as a cellular modem, and (v) retaining full portability of the computer for flexibility of use and prevention of theft." Thus, nothing is disclosed in U.S. Pat. No. 5,555,491 regarding connecting the computer to a vehicle power source. Furthermore, there is no disclosure in U.S. Pat. No. 5,555,491 regarding connecting the computer to a stereo system of the vehicle.

U.S. Pat. No. 6,113,047 discloses a "dual point vehicle mount for computer terminal". It is disclosed in this patent that "A vibration resistant mounting bracket has a base attachable to a support structure by bolts. Isolator bushings are positioned in the mounting holes in the bracket to isolate the bracket from shocks and vibration. A pair of arms project perpendicularly from the base. Each arm has a round opening and an arcuate opening concentric with the round opening. A first fastener pivotably connects a terminal to each arm of the bracket at a pivot axis defined by the round openings. A second fastener has a shaft extending through the arcuate opening and into a second threaded opening in the terminal. The second fastener may be tightened and loosened to secure the terminal in a pivot position relative to the bracket and release the terminal from the pivot position to change to a different pivot position." Nothing is disclosed in U.S. Pat. No. 6,113,047 regarding connecting the computer terminal to a vehicle power source or to a stereo system of the vehicle.

U.S. Pat. No. 5,973,917 discloses a "portable motor vehicle work station". It is disclosed in this patent that "The present invention is a portable work station which is designed to be used in motor vehicles. The work station is a cabinet which is capable of being secured to a passenger seat of the motor vehicle, preferably by an attached securing means. There is provided a computer tray which is adapted to be releasable attachable to the work surface of the work station and capable of being received within the interior of the work station. An alternate embodiment of the present invention provides a computer tray which is attached to an articulated cantilever system which, when the lid to the main compartment is opened, projects and presents the computer tray and any computer which is secured thereon."

It is also disclosed in U.S. Pat. No. 5,973,917 that "Furthermore, there is provided at least one electrical power plug(s) 70 in the front side 13 which provide power to a computer, printer or other accessories, such as a small desk lamp or the like. In order to provide the correct form of electrical power, there may be [by], enclosed by the cabinet 10, a power converter which is adapted to convert direct current electricity to alternating current electricity, 110 volt rms. The at least one power plug(s) 70 are adapted to be capable of electrical connection with a secured computer.

However, nothing is disclosed in U.S. Pat. No. 5,973,917 regarding connecting the-work station U.S. Pat. No. 5,966,285 discloses a "mobile portable computer docking/office station". It is disclosed in this patent that "A mobile portable computer docking/office station is adapted for use in an automotive vehicle or a hotel room and includes a portable housing which may be rested on a car or truck seat. The housing is shaped to resemble a child's car seat, and has exterior side surface indentations which receive portions of the vehicle's passenger side seat belt structure to hold the housing in place on the vehicle seat. A docking area is formed in the housing and is provided with an electrical connector that mates with a corresponding connector on a portable computer when the computer is operatively inserted into the docking area. A printer/scanner unit, a cellular modem, a pair of speakers, and a computer battery charger are carried by the housing and are operatively coupled to the docking area connector. DC electrical power may be transmitted to these components by a self-retracting power cord carried by the housing and having an outer end member that may be plugged into the vehicle's cigarette lighter. A cellular phone is also included with the docking/office station and is removably supportable in a cradle recess formed in the housing portion of the portable docking/office station."

This docking station is not attached to the vehicle. Also, nothing is disclosed in U.S. Pat. No. 5,966,285 regarding connecting the portable computer to a stereo system of the vehicle.

U.S. Pat. No. 5,859,762 discloses a "docking station for portable computers". It is disclosed in this patent that "A portable computer holder is adjustably mounted on a base portion that is attachable to the floor of a vehicle and is provided with a means for heating the portable computer when the computer is positioned in the holder. The heated holder effectively solves the problem of maintaining a portable computer at an operable temperature in cold environments."

U.S. Pat. No. 5,859,762 states that "A port replicator 50 is also provided as a standard component, enabling the computer to be readily connected to the peripheral components and an external power supply." and "Preferably the heating elements 64, 66 are powered by an external source, such as standard 110 volt line current, to avoid drain on a vehicular or auxiliary battery source." Nothing is disclosed in U.S. Pat. No. 5,859,762 regarding connecting the portable computer to a vehicle power source or to a stereo system of the vehicle.

U.S. Pat. No. 5,751,548 discloses a "docking station for a portable computer providing rotational movement of the computer's viewable screen in three different planes". It is stated in this patent that "A portable computer docking station that is capable of allowing rotational movement of the computer's viewable screen in at least three different planes, thereby facilitating viewing and other utilization (e.g., using a pen) of the screen within a motor vehicle. The docking station defined herein is provided with a means for heating the portable computer when the computer is positioned in the docking station's holder portion. The heated holder portion effectively solves the problem of maintaining a portable computer at an operable temperature in cold environments. A vehicular computer assembly is also provided."

It is stated in U.S. Pat. No. 5,751,548 that "Preferably, the invention's heating elements are powered by an external source, such as standard 110 volt line current, to avoid drain on a vehicular or auxiliary battery source." Nothing is disclosed in U.S. Pat. No. 5,751,548 regarding connecting the portable computer to a vehicle power source or to a stereo system of the vehicle.

U.S. Pat. No. 6,032,089 discloses a "vehicle instrument panel computer interface node". It is disclosed in this patent that "A communication system includes a miniaturized palmtop computer which is information-coupled to a programmable node positioned in an instrument panel of a vehicle. The computer is removably resident in a pod or pocket of the instrument panel and communicates with a node either wirelessly or via a connectorized bus. Redundant radio and HVAC displays form at least one surface of the pod for use by vehicle operators not using the computer option." It is stated that the CIPN (center instrument panel node) 300 "communicates with the audio system inputs via bus 360. Power on/off switch 338 is a momentary push button switch." However, nothing is disclosed in U.S. Pat. No. 6,032,089 regarding connecting the palmtop computer to a vehicle power source.

It is an objective of the present invention to provide for an improved vehicle docking station and holder for use with a portable computer. It is also an objective of the present invention to provide for a vehicle docking station and holder that is designed for use with an HP Jornada™ portable computer.

SUMMARY OF THE INVENTION

To accomplish the above and other objectives, the present invention provides for an improved docking station and holder for use with a portable computer. The present invention specifically provides for a docking station designed for use with an HP Jornada™ portable computer. The docking station connects to a center console, for example, of a vehicle. The docking station holds the Jornada portable computer in place for ease of use while driving. The docking station contains a cigarette lighter adapter for power and a cable that connects it to the stereo system of the vehicle to provide for audio (MP3) playback of music, and the like. The present invention provides ease of use while in a vehicle and allows Jorna MP3 music files, for example, to be played through the vehicle stereo system.

Exemplary docking apparatus for use with a portable computer in a vehicle comprises a bracket having a base and an arm for attaching the docking apparatus to a dashboard of the vehicle. A docking cradle is attached to the arm and comprises a connector adjacent its lower end that mates with a connector of the portable computer to electrically interconnect the personal computer to the docking cradle. A power cable and connector is coupled to the docking cradle for connecting it to a vehicle power source. An audio cable is coupled to the docking cradle for connecting it to a vehicle audio system.

BRIEF DESCRIPTION OF THE DRAWINGS

The various features and advantages of the present invention may be more readily understood with reference to the following detailed description taken in conjunction with the accompanying drawing FIGURE, which illustrates an exemplary portable computer docking station and holder in accordance with the principles of the present invention disposed in a vehicle.

DETAILED DESCRIPTION

Referring to the sole drawing FIGURE it illustrates an exemplary docking station and holder 10 in accordance with the principles of the present invention. The docking station and holder 10 is specifically designed for use with an HP Jornada™ portable computer 15.

The docking station and holder 10 is shown disposed in a vehicle 11 (generally designated). The upper left portion of the drawing figure illustrates the docking station and holder 10 attached to a dashboard 12 of the vehicle 11. The lower and right portion of the drawing figure illustrates an enlarged view of the docking station and holder 10 along with various interconnections to components of the vehicle 11 and a vehicle audio system 13.

The docking station and holder 10 comprises a bracket 21 that attaches the docking station and holder 10 to the dashboard 12 of the vehicle 11. The bracket 21 has a base 22 and an L-shaped arm 22a that couples the base 21 to a docking cradle 23 which is preferably made of plastic. The docking cradle 23 is preferably designed and configured to receive and hold the HP Jornada™ portable computer 15.

The docking cradle 23 has a connector 24 adjacent its lower end that mates with a connector (not shown) that is part of the HP Jornada™ portable computer 15. The docking cradle 23 has a contour that slidably receives the HP Jornada™ portable computer 15 therein and allows mating of the connector 24 with the connector of the HP Jornada™ portable computer 15.

As is shown at the right side of the drawing figure, the docking cradle 23 also includes a power cable 25 and connector 26 comprising a cigarette lighter adapter 26 that connect it to a vehicle battery (not shown). This connection allows the docking station and holder 10 to power the HP Jornada™ portable computer 15 when it is in the docking cradle 23.

As is shown in the right and lower portions of the drawing figure, an audio cable 27 interconnects the docking cradle 23 to the vehicle audio system 13. Such interconnections may be made in any conventional manner. The audio cable 27 is used to connect the HP Jornada™ portable computer 15 to the vehicle audio system 13 in the vehicle. The audio cable 27 has a connector 27a that is connected to an input connector 28 of the vehicle audio system 13, or through its auxiliary input jack located on the back panel of the audio system 13. This connection permits audio playback of MP3 music files, and the like, that are stored in the HP Jornada™ portable computer 15 by way of the vehicle audio system 13.

Thus, a vehicle docking station and holder for holding a portable computer, and that is particularly well-suited for use with an HP Jornada™ portable computer, has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. Docking apparatus for use with a portable computer in a vehicle, comprising:

a bracket including a base and an arm for attaching the apparatus to a dashboard of the vehicle; and a docking cradle attached to the arm that comprises a connector adjacent its lower end that mates with a connector of the portable computer to electrically interconnect the portable computer to the docking cradle;

a power cable and connector for connecting the docking cradle to a vehicle power source; and an audio cable interconnects the docking cradle to a vehicle audio system.

2. The apparatus recited in claim 1 wherein the portable computer comprises HP Jornada portable computer.

3. The apparatus recited in claim 1 wherein the docking cradle comprises plastic.

4. The apparatus recited in claim 1 wherein the power cable and connector comprise a cigarette lighter adapter.

5. The apparatus recited in claim 1 wherein the audio cable electrically connects the portable computer to the vehicle audio system.

6. The apparatus recited in claim 1 wherein the audio cable is connected to an input connector of the vehicle audio system.

7. The apparatus recited in claim 1 wherein the audio cable permits audio playback of music files stored in the portable computer.

* * * * *